United States Patent Office 3,518,142
Patented June 30, 1970

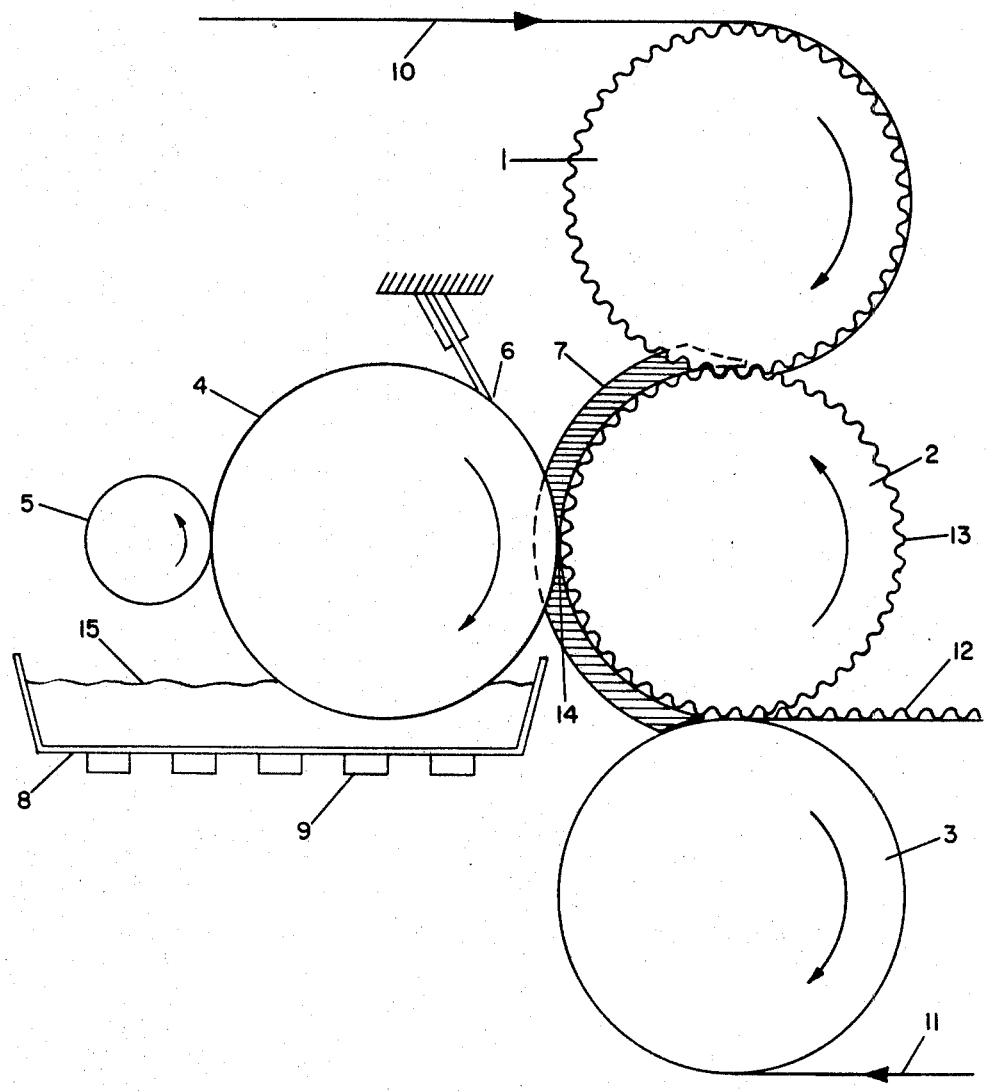
FIG. I
INVENTOR.
WILLIAM P. DOOLEY
BY
Donald R. Johnson
ATTORNEY

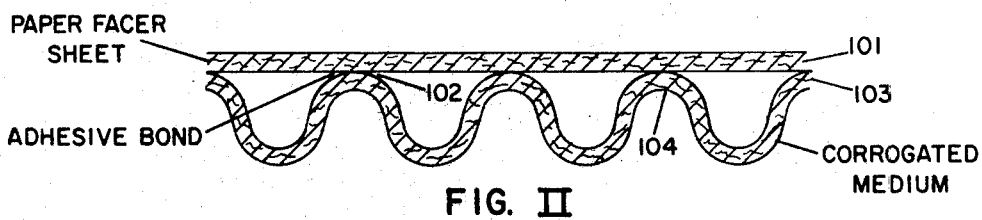
FIG. II
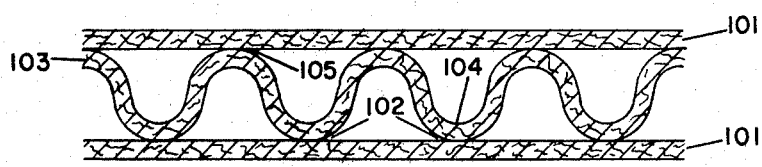
FIG. III
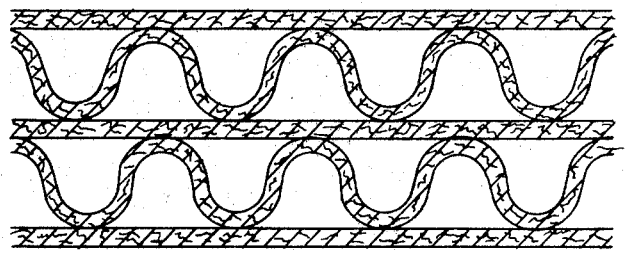
FIG. IV
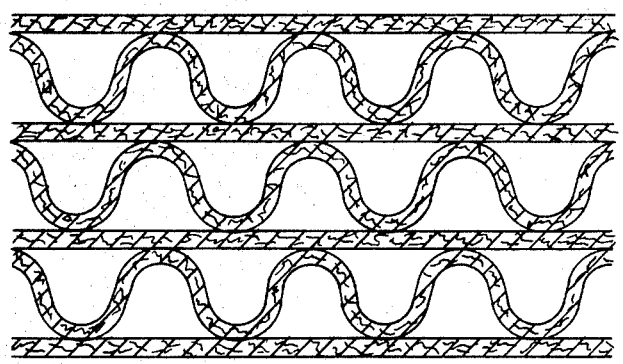
FIG. V

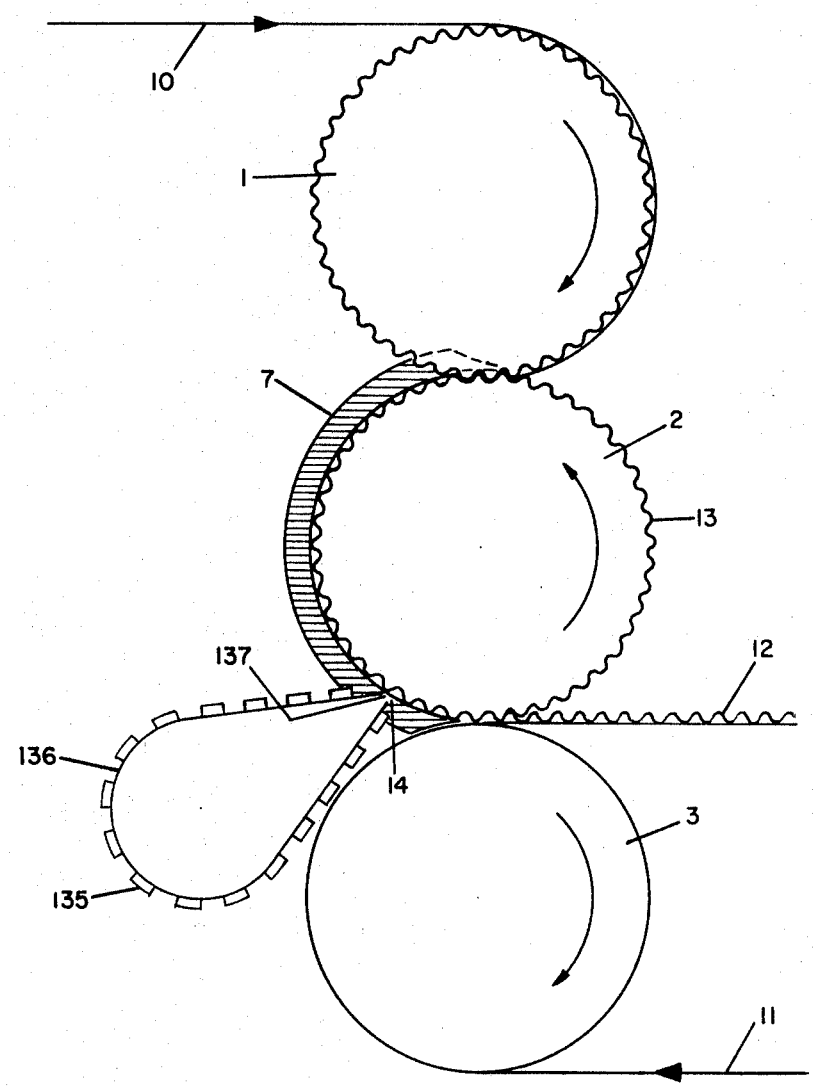
FIG. VI
INVENTOR.
WILLIAM P. DOOLEY

3,518,142
PROCESS FOR APPLYING HOT MELT ADHESIVE TO CORRUGATED PAPERBOARD
William P. Dooley, Wallingford, Pa., assignor to Sun Oil Company, Philadelphia, Pa., a corporation of New Jersey
Filed July 21, 1965, Ser. No. 473,581
Int. Cl. B31f 1/22
U.S. Cl. 156—205                           25 Claims

ABSTRACT OF THE DISCLOSURE

Corrugated paperboard which is highly resistant to the effects of moisture can be produced at high rates of speed, i.e., up to and exceeding 1000 linear feet per minute by the use of hot melt adhesives which are applied to the flute tips of the corrugated medium. In order to operate successfully on corrugating machinery, the hot melt adhesives must have ring and ball softening points in the range of 160–240° F. and Brookfield viscosities of 15,000–58,000 centipoises in the temperature range of about 280° F.–310° F.

---

The present invention relates to a process for applying hot melt adhesives to corrugated kraft board in automatic corrugated paperboard machinery.

The use of hot melt adhesives in corrugated paperboard machinery to produced corrugated paperboard is a new development in the corrugated paperboard art. The techniques and conditions previously employed with conventional starch based adhesives are not applicable to hot melt adhesives. This is the result of the intrinsic difference between hot melt adhesives and other types of adhesives. Hot melt adhesives produce a bond by mere cooling as distinguished from cross-linking or other chemical reactions. Moreover, there is no solvent in the hot melt technique that must evaporate for tack to develop.

In order to fully explain the hot melt technique, a schematic representation for the production of a single-facer corrugated paperboard is shown in FIG. I. The corrugating medium 10, usually a mixture of semi-chemical paper and waste paper (kraft paper, newsprint, etc.) is treated with superheated steam and passed between the top corrugating roll 1, and the bottom corrugating roll 2. The hot corrugated medium which is formed on the teeth 13 of bottom corrugating roll 2 is guided by finger 7 to follow said bottom corrugating roll to a point immediately prior to contact with transfer roll 4 which just touches the corrugated flutes 14 without any substantial pressure, so that the hot melt adhesive 15 is transferred to the tips of said corrugated flutes 14. The corrugated board flutes containing the hot melt adhesive are guided to follow bottom corrugating roll 2 by finger 7, which continues at a point immediately subsequent to the contact with transfer roll 4 to a point immediately prior to contact under pressure with liner 11, usually a suitable grade of kraft paper, between bottom corrugating roll 2 and pressure roll 3, thus pressing the adhesive bearing flute tips against the facer sheet to form single faced corrugated paperboard. At this point there must be sufficient hot tack to hold the corrugated sheet and the facer sheet together until the hot melt has set i.e., an initial bond.

During the process described above, transfer roll 4 continually rotates at the same speed as the bottom corrugating roll 2, passing into the resin pan 8 which is maintained at the desired temperature by suitable heaters 9, for instance strip heaters. The transfer roll picks up a thin film of hot melt adhesive 15, which is regulated to the desired thickness by use of the doctor roll 5 or the doctor blade 6.

During various runs of the type described above, it was observed that sometimes the transfer roll failed to pick up any or sufficient hot melt adhesive or that little or no hot melt adhesive was transferred from the transfer roll to the corrugated flute tips.

It was found that if the corrugated flutes 14 were at a higher temperature than the hot melt adhesive on the transfer roll 4 that little or no adhesive was transferred to the flute tips. Likewise, if the transfer roll 4 were hotter than the hot melt adhesive in the resin pan 8 little or no adhesive was picked up.

As stated above the corrugating medium 10 is treated with superheated steam and runs between top corrugating roll 1 and bottom corrugating roll 2. This is a conventional step in the art, and the conditions that have been developed by the art to achieve the corrugating in the best manner result in the corrugated flutes 14 being at about 280° F. at the time they contact the transfer roll 4. It has been found that for proper transfer of the hot melt adhesive from the transfer roll to the tips of the corrugated flutes that the temperature of the transfer roll must be the same or greater than the temperature of the flutes, i.e., at least 280° F. Likewise, the temperature of the hot melt adhesive in the resin pan 8 must be the same or greater than the temperature of the transfer roll for proper pick-up of the hot melt adhesive. The hot melt adhesive in the resin pan is usually in the range of about 300° F. to 350° F. The hot melt adhesive on the transfer roll is usually in the range of about 290° F. to 310° F. but always the same or less than the temperature of the hot melt in the resin pan.

The difference in temperature between the resin immediately prior to transfer to the flute tips and the corrugated flutes is no greater than 30° F., regardless of the means of transfer.

Another very real consideration in determining the preferred operating temperature range is the economic competitiveness of the hot melt adhesives with conventional adhesives. The lower temperature, i.e., 280° F. to 350° F., requires less energy to maintain, is less expensive since the hot melt adhesive has better pot life, and is more easily adapted to the existing corrugating machinery. However, these existing reasons for the present preferred range can be overcome in the future by improved equipment designed and improved hot melt adhesives.

Hot adhesive presently offer a number of advantages over conventional adhesives now in use. The most outstanding advantages of hot melt adhesives over conventional adhesives of the prior art are (1) the improved efficiency of corrugating machinery and (2) superior characteristics of bonds formed with hot melt adhesives. Both of these advantages are attributable to the absence of water in the hot melt technique.

The speed at which the corrugtaing machinery can run is of course a measure of the units of work that a particular machine can produce during its up time. Maximum operating speed with starch type conventional adhesives on corrugating machinery is about 700 feet of corrugated board per minute. Only single facer corrugated board, however, can be produced at this speed with the conventional water based adhesives. When double faced board such as that shown in FIG. III or double (FIG. IV) or triple (FIG. V) wall paperboard is produced the speed which these machines can run is greatly reduced. The reason for this required reduction in speed is the water in the conventional adhesives. The corrugating machinery can operates no faster than the water can be removed from the adhesive and paper. As there are additional layers of facer and corrugated medium, as in FIGS. III to V, the removal of water becomes more difficult and slower operation of the corrugating machinery is required.

In regard to the double wall corrugated paperboard of FIG. IV and the triple wall corrugated paperboard of FIG. V, it should be noted that each layer of corrugated medium has a different phase, i.e. no pattern is developed as between the layers of corrugated medium. This results in corrugated board having random placement of the corrugated flutes in each layer in relation to the flutes of any other layer. This provides a corrugated paperboard of greater stability. The double and triple wall corrugated board are being extensively used in packaging of large objects where maximum strength and protection is desired, such as furniture.

The corrugated medium, although generally produced from semi-chemical paper and waste paper such as kraft or newprint, may be of other material such as kraft paper, thermoplastic and thermosetting materials and glass fiber. One material on which recent developmental work has been done is steel foil.

There has been until now, no way to produce satisfactory corrugated board at speeds greater than 700 feet per minute using the conventional adhesives. It is a significant development that hot melt adhesives allow corrugated machines to operate at much greater rates of speed. Holt melt adhesives of the type discussed herein have been successfully applied to corrugated paper to produce good corrugated board at speeds above 700 feet per minute in modified conventional corrugating machinery. It is expected that with equipment capable of higher speeds that rates of up to 1000 feet per minute or greater can be achieved commercially with hot melt adhesives. The limiting factor is now in the machinery rather than in the adhesive as was true of the prior art. The process of the instant invention is usually run at speeds of at least 300 feet per minute and preferably around 500 feet per minute or more and is not restricted by the type of board produced.

Although the present invention is related to hot melt adhesives on presently existing corrugated paperboard machinery developed for water based adhesives, it is readily understood that hot melt adhesives will allow future corrugated paperboard machinery to be of much simpler design and construction.

One such embodiment of simpler machinery and process is that represented in FIG. VI which is a schematic presentation for the production of single facer corrugated paperboard employing a metering device in place of a resin pan, transfer roll and doctor blade. The enclosed resin pan 136 is connected to a metering device 137 by which the hot melt adhesive is applied directly from the resin pan to the corrugated flute tips 14. The resin pan is maintained at the desired temperature by strip heaters 135. The hot melt adhesive is forced out through the metering device 137 by application of constant pressure to the enclosed resin pan 136, for instance by the use of an inert gas, nitrogen, at a gage pressure sufficient to force the resin in the stated viscosity range, through the metering device 137 on to the tips of the corrugated flutes 14. The adhesive bearing flutes are then contacted with the facer sheet 11 between the bottom corrugating roll 2 and the pressure roll 3 to form corrugated paperboard.

When a metering device such as that represented in FIG. VI is used in place of a transfer roll, an added degree of flexibility is given to the corrugating machine. A metering device may conveniently be placed in almost any relationship to point where the corrugated flute tips containing the adhesives are contacted with the facer. This allows the operator to obtain the maximum benefit from the particular properties of a given hot melt adhesive.

The hot melt adhesive bonds are unaffected by dampness or moisture. The primary failure in the bond of wet corrugated board produced with hot melt adhesives is in the substrate (kraft paper in this case). If corrugated board produced from hot melts is soaked in water and allowed to dry, the bond is nearly as strong as it was originally, the fiber of the paper having been somewhat weakened; whereas corrugated board produced from conventional adhesives is no longer bonded after soaking because of the effect of water on the adhesive. Facer sheets treated with thermoplastic and thermosetting materials for strength and water resistance are more easily bonded with hot melt adhesives than conventional adhesive because of the nature of the hot melt adhesive bond.

The thickness of the adhesive layer applied is conveniently determined by the use of a doctor blade 6 or doctor roll 5. The doctor blade is set at a particular clearance, for instance .010 inch. All of the adhesive above this thickness is scraped off and travels to the edge of the doctor blade where it falls back into the resin pan 8. As the 0.010 inch thick film of adhesive contacts the corrugated flutes, about one-half of the adhesive goes to the flute tips and one-half remains on the transfer roll for recycle to the resin pan. The doctor roll is set at approximately twice the clearance of the doctor blade in order to get the same amount of adhesive on the flutes because as the doctor roll rotates, it retains about one-half of the adhesive passing through the clearance. It is of course desirable to employ as little adhesive as possible to obtain satisfactory corrugated board. Usually doctor blade clearances of .003 inch to .010 inch are employed to give hot melt adhesive thickness of about .001 to .005 inch applied on the corrugated flutes.

In the instant process, the suitability of a particular thermoplastic material as a hot melt adhesive depends on the proper viscosity at the operating temperatures to allow the adhesive to be deposited without objectionable stringiness to the corrugated flutes and to develop almost instantaneous hot tack, when the corrugated flutes are contacted with the facer sheets, sufficient to adhere the liner (liner and facer are interchangeable in the art) to the corrugated medium.

It has been determined that at the opertaing temperatures of the transfer roll a Brookfield viscosity in the range of 15,000 to 58,000 centipoises is necessary to provide a hot melt adhesive that is readily picked up by the transfer roll, reduced to the proper thickness by the doctor blade or doctor roll and evenly applied to the corrugated flute tips without objectionable stringiness or spotty application. This viscosity allows for the penetration of the hot melt adhesive into the fiber of the corrugated medium sufficiently and to retain enough fluidity so that by the time the corrugated medium is contacted with the liner 11 between the bottom corrugating roll 2 and the pressure roll 3 that the adhesive will penetrate the fiber of the liner and encompass at least the first layer of paper fiber in order to form a tear seal fiber tear after the hot melt adhesive sets. A tear seal is indicated when the adhesive bond produces failure in the substrate (in this case paper) when the corrugated medium and the facer sheet are pulled apart. For these same considerations as to the behavoir of the hot melt on the corrugated medium and facer the viscosity range of 15,000 to 58,000 centipoises is required for any means of applying the hot melt to the corrugated flutes.

In addition to the necessity for the viscosity of the hot melt adhesive to be such that it will wet the fiber of the facer sheet when the corrugated flutes containing the hot melt are contacted with the facer sheet at the pressure roll 3, the viscosity must be such that the corrugated paper is adhered to the facer sheet at the same time. This hot tack must be of sufficient strength to hold the two sheets together, i.e., an initial bond, until the hot melt adhesive has set.

These two factors of penetration and tack are conflicting characteristics. Good penetration is achieved by low viscosity; however, the desired penetration should be no more than the thickness of two or three fibers of paper. This will assure a good bond with the minimum hot melt material. In order to develop sufficient hot tack, the hot melt should have a fairly high viscosity that will hold the two sheets together. The two conflicting results are achieved when the Brookfield viscosity is in the range of 15,000 to 58,000 cps. at the operating temperatures of the corrugating process.

A hot melt adhesive as the term is used in the present invention is a thermoplastic material that is a solid at ambient temperature and upon heating, melts and may be applied to a substrate which in turn is applied to another substrate so that one substrate is bonded to the other through the cooling and setting of thermoplastic material. One way to bond the substrates together is to apply the second substrate to the substrate containing the hot melt immediately after the hot melt is applied. Another way is to apply the hot melt to one substrate and allow it to cool until it is hard again. Since the hot melt adhesives are thermoplastic, the substrate containing the solidified hot melt adhesive material may be heated until the material melts and a second substrate applied. The essential feature of any hot melt adhesive is that upon cooling the hot melt, after it is applied to the desired substrate, forms a bond by simple cooling.

It has been found that suitable hot melt adhesive for the present invention must have a ring and ball softening point of at least 160° F. and preferably at least 180° F. Generally a maximum ring and ball softening point is about 196° F. However, some hot melt adhesives having proper viscosities in the operational temperature range have higher ring and ball points as high as 240° F.

In order to more clearly indicate the process of the present invention, the following examples are set forth.

EXAMPLE I

The hot melt adhesive employed is a mixture of a homogeneous thermoplastic material composed of 60 wt. percent of a formolite type resin (1% 2,6-ditert-butyl-4-methylphenol (BHT) antioxidant) and 40 wt. percent of Elvax 150. The formolite type resin is produced from catalytic gas oil reacted with formaldehyde in the presence of a sulfuric-acetic acid catalyst. Elvax 150 is an ethylene-vinyl acetate copolymer resin containing about 33 wt. percent vinyl acetate. This hot melt adhesive mixture has a ring and ball softening point of about 92° C. and Brookfield viscosity at 300° F. of 37,000 cps. and at 350° F. of 13,000 cps. The preparation and properties of the foregoing ingredients and hot melt adhesive composition are set forth in greater detail in commonly assigned U.S. Pat. 3,419,641.

The above hot melt adhesive composition was placed in the resin pan of 14 inch single facer sheet corrugating machine modified to handle hot melt adhesives. The hot melt adhesive in the resin pan was heated to about 320° F. The temperature on the transfer roll was adjusted to 310°. During the operation of the corrugating machine, the corrugated flutes were at approximately 280° F. when contacted with the transfer roll. After the run in the corrugating machine was initiated, the speed was rapidly taken up to 500 feet per minute of corrugated board and maintained for a time sufficient to give an evaluation of the process. The doctor blade had clearance of .003 inch. There was little stringing of the hot melt as it was applied from the transfer roll to the corrugated flutes. The corrugated single-facer board prepared had a good bond requiring about 1.16 pounds of hot melt adhesive per thousand square feet of single-facer board. The test was performed on "A" flutes, which contain 36 flutes per foot.

Two other hot melt adhesives were evaluated in the same manner as in Example I and the compositions were as follows:

EXAMPLE II

A hot melt composition consisting of 75 wt. percent atactic polypropylene (containing 1% BHT) and 25 wt. percent Elvax 150 was tested as in Example I. The composition had a ring and ball softening point of 117° C. and Brookfield viscosity at 300° F. of 11,600 and at 350° F. of 5,500.

EXAMPLE III

In the same manner of the previous examples, the following composition was prepared and tested: about 20 wt. percent of standard grade styrene-butadiene rubber, 11 wt. percent of low melting paraffin petroleum wax and 67 wt. percent formolite type resin (containing 1% antioxidant). This composition had ring and ball softening point of 94° C. and viscosity at 300° F. of 100,000 and at 350° F. of 32,000.

The results of the tests are set out in the tables below.

TABLE 1

| Example | Composition | | |
|---|---|---|---|
| | R&B, °C. | Viscosity, cps. | |
| | | 300° F. | 350° F. |
| II | 117 | 11,600 | 5,500 |
| I | 92 | 37,000 | 13,000 |
| III | 94 | 100,000 | 32,000 |

TABLE II

| Example | Temperature on transfer roll, °C.[1] | Adhesive behaviour | | Adhesive pattern | | Film behavior | | Degree of stringing | Condition of Bond[2] |
|---|---|---|---|---|---|---|---|---|---|
| | | Speed, ft./min. | On transfer roll | Corrugating medium | Facer sheet | Corrugating medium | Facer sheet | | |
| II[3] | 330 | 20 | Smooth | Good | Good | Normal | Normal | None | No bond.[4] |
| | | 50 | do | do | do | do | do | do | Do.[4] |
| | | 200 | do | do | do | do | do | do | Do.[2] |
| I[3] | 330 | 50 | do | do | do | do | do | Little | Fair. |
| | | 200 | do | do | do | do | do | do | Good all-fiber tears. |
| III[3] | 330 | 50 | do | do | do | On surface | Some penetration. | Heavy | Poor. |
| | | 200 | do | do | do | do | do | Very little | Do. |

[1] Adhesive in resin pan and on transfer roll at same temperature.
[2] Characterizes nature of adhesive in bonded areas as to degree at fiber tear.
[3] Doctor blade setting 0.010 inch and temperature on transfer roll 310° C.
[4] No hot tack.

Prior to the testing in the corrugator each of the hot melt compositions described in Examples I to III were subjected to two screening tests.

The first is the tear seal test. The sample is made on 50 pound kraft paper cut into 1 by 6 inch strips. One strip is coated on a single side for a length of two inches with a 1 to 2 mil coating of hot adhesive and another strip is placed over the first strip. The sample then consists of two layers of paper bonded together on internal surfaces over a two square inch area at one end. The test is made by gripping the free ends of the strips and pulling slowly in opposite directions perpendicular to the bond. A tear seal is indicated when the adhesive bond produces failure in the substrate (in this case kraft paper) at room temperature and at −25° F.

The second test is the delamination test. This test is made by forming a 2 inch lap joint with two 1 by 6 inch 50 pound kraft paper strips. The sample is joined by a two square inch area of adhesive having a thickness of 1 to 2 mils. The total length of the sample is 10 inches. The strip is suspended in a 150° F. oven for one-half hour.

There should be no indication of the paper substrates parting in order to pass the test.

All three hot melt compositions passed these initial screening tests and appeared to be equivalent as hot melt adhesives. However, when actually employed in corrugating machinery, only the composition, Example I, with a viscosity in the range of 15,000 to 58,000 centipoises at the normal corrugating temperatures was successful. As shown by these three examples, materials falling outside of the viscosity range are not satisfactory.

The composition of a particular hot melt adhesive is of no consequence to the present invention. Any hot melt adhesive which meets the ring and ball softening point and the viscosity requirements will operate according to the invention.

The amount of hot melt adhesive applied to corrugated flutes is not critical so long as a bond is formed, although generally corrugated board suitable for box manufacture has at least .75 pound of HMA per 1000 square feet. The use of more than 1.25 pounds of HMA per 1000 square feet is not necessary for the production of satisfactory corrugated paperboard. In fact, the use of more hot melt adhesive than this results in the excessive adhesive as shown in FIG. III by 105. Of course the buildup of excessive adhesives does add to the strength of the bond, however, such excessive built-up does not result in an increase in strength proportional to the excessive adhesive. And, moreover, the corrugated board produced containing .75 to 1.25 pounds of hot melt adhesive has strength commensurate with commercial corrugated board produced from conventional water based adhesives.

The instant process, which is described principally in terms of single facer corrugated paperboard production, works equally well for the production of double facer corrugated paperboard. The machinery for the double facer board is somewhat larger but may be modified generally as indicated in the schematic drawing for single facer board in order to apply the hot melt adhesive. The conditions of operation and the various physical relationships disclosed for single facer corrugated board apply equally well for double facer corrugated board. In a similar manner hot melt adhesives give superior performance to conventional water-based adhesive for producing double and triple wall corrugated paperboard.

FIGS. II and III represent single facer and double facer corrugated paperboard, respectively. The facer sheet 101 is joined to the corrugated medium 103 at contacts formed between said facer sheet and the flutes 104 by the adhesive bond 102 produced when the hot melt adhesive sets.

The particular modifications of conventional corrugating machinery to achieve the present invention are within the ability of one skilled in the art.

All hot melt formulations that have desirable rates of developing tack, that is, very slight cooling cause the viscosity to develop to the point where it will hold the corrugated sheet and the facer sheet together until the hot melt adhesive sets, do not have the necessary viscosities in the range of 15,000 to 58,000 centipoises at the operating temperature range for corrugated paperboard machinery. The rate of viscosity change is a constant property for a particular hot melt composition thus by adding plasticizers or fillers the viscosity at a particular temperature can be adjusted without affecting the desirable rate at which hot tack develops.

Suitable plasticizers include the phthalates such as butyl benzyl phthalates, butyl cyclohexyl phthalate, phosphate esters, sulfonamides, chlorinated biphenyls and others known in the art. Fillers found suitable include asphalt, clays, such as bentonite clays, and asbestos.

The invention claimed is:

1. Process of making corrugated paperboard which comprises the steps of:
   (a) corrugating a paper medium at about 280° F.
   (b) contacting the flutes of said corrugated medium with a hot melt adhesive maintained prior to said contacting in the temperature range of 300° F. to 350° F. until said contacting when said hot melt adhesive is in the temperature range of 280° F. to 310° F. provided, however, that the temperature of said contacting is not greater than the temperature at which said hot melt adhesive is maintained prior to said contacting, the temperature of said flutes being about 280° F. the Brookfield viscosity of said hot melt adhesive being in the range of 15,000 to 58,000 centipoises in the temperature range of said contacting and a ring and ball softening point in the range of 160–240° F. so as to transfer a portion of said hot melt adhesive onto said flutes and
   (c) subsequently contacting said flutes bearing said hot melt adhesive with kraft paper liner so as to form a continuous sheet of corrugated paperboard.

2. Process according to claim 1 wherein the hot melt adhesive is transferred onto the tips of said flutes.

3. Process according to claim 1 wherein a single kraft paper liner is applied to one side of the corrugated kraft paper.

4. Process according to claim 1 wherein a kraft paper liner is applied to both sides of the corrugated kraft paper.

5. Process of making corrugated paperboard which comprises the steps of:
   (a) corrugating a paper medium at about 280° F.
   (b) contacting the flutes of said corrugated paper medium with a hot melt adhesive maintained prior to said contacting in the temperature range of 300° F. to 350° F. until said contacting when said hot melt adhesive is in the temperature range of 280° F. to 310° F. provided, however, that the temperature of said contacting is not greater than the temperature at which said hot melt adhesive is maintained prior to said contacting, the temperature of said flutes being about 280° F., the Brookfield viscosity of said hot melt adhesive being in the range of 15,000 to 58,000 centipoises in the temperature range of said contacting and a ring and ball softening point in the range of 180–196° F. so as to transfer a portion of said hot melt adhesive onto said flutes and
   (c) contacting said flutes bearing said hot melt adhesive with kraft paper liner so as to form a continuous sheet of corrugated paperboard.

6. Process according to claim 5 wherein the hot melt adhesive is transferred onto the tips of said flutes.

7. Process according to claim 5 wherein a single kraft paper liner is applied to one side of the corrugated paper medium.

8. Process according to claim 5 wherein a kraft paper liner is applied to both sides of the corrugated paper medium.

9. Process according to claim 5 wherein the thickness of the portion of hot melt adhesive transferred to the flutes is from 0.001 inch to 0.005 inch.

10. Process according to claim 5 wherein the rate of contacting the corrugated paper medium with a hot melt adhesive is at least 300 feet of corrugated kraft paper per minute.

11. Process according to claim 10 wherein the rate of contacting is about 500 feet per minute.

12. Process of making corrugated paper board which comprises the steps of:
   (a) corrugating a paper medium at about 280° F. to form a continuous corrugated sheet
   (b) contacting the flutes of said corrugated paper medium with a hot melt adhesive maintained prior to said contacting in the temperature range of 300° F. to 350° F. until said contacting when said hot melt adhesive is in the temperature range of 280° F. to 310° F. provided, however, that the temperature of said contacting is not greater than the temperature at which said hot melt adhesive is maintained prior to said contacting, the temperature of said flutes being about 280° F., the Brookfield viscosity of said hot melt adhesive being in the range of 15,000 to 58,000 centipoises in the temperature range of said contacting and a ring and ball softening point in the range of 160–240° F., so as to transfer a portion of said hot melt adhesive onto said flutes and (c) subsequently contacting said flute tips bearing said hot melt adhesive with kraft paper liner so as to form a continuous sheet of corrugated paperboard.

13. Process according to claim 12 wherein a single kraft paper liner is applied to one side of the corrugated paper medium.

14. Process according to claim 12 wherein a kraft paper liner is applied to both sides of the corrugated paper medium.

15. Process of making corrugated paperboard which comprises the steps of:
(a) corrugating a paper medium at about 280° F. to form a continuous corrugated sheet
(b) contacting the flutes of said corrugated paper medium with a hot melt adhesive having a ring and ball softening point of at least 160° F. maintained prior to said contacting in the temperature range of 300° F. to 350° F. until said contacting when said hot melt adhesive is in the temperature range of about 290° F. to about 310° F. provided, however, that the temperature of said contacting is always less than the temperature at which said hot melt adhesive is maintained prior to said contacting, the temperature of said flutes being about 280° F., the Brookfield viscosity of said hot melt adhesive being in the range of 15,000 to 58,000 centipoises in the temperature range of said contacting and a ring and ball softening point in the range of 180–196° F. so as to transfer a portion of said hot melt adhesive onto the tips of said flutes and
(c) contacting said flute tips bearing said hot melt adhesive with kraft paper liner so as to form a continuous sheet of corrugated paperboard.

16. Process according to claim 15 wherein a single kraft paper liner is applied to one side of the corrugated paper.

17. Process according to claim 15 wherein a kraft paper liner is applied to both sides of the corrugated kraft paper.

18. Process according to claim 15 wherein the thickness of the portion of hot metal adhesive transferred to the flutes is from 0.001 inch to 0.005 inch.

19. Process according to claim 15 wherein the rate of contacting the corrugated kraft paper with a hot melt adhesive is at least 300 feet of corrugated kraft paper per minute.

20. Process according to claim 15 wherein the rate of contacting is about 500 feet per minute.

21. The process of producing corrugated paperboard wherein the temperature of operation is in the range of from about 280° F. to 350° F. wherein hot corrugated medium is contacted with a hot melt adhesive the temperature of said contacting is not greater than the temperature at which said hot melt adhesive is maintained prior to said contacting said hot melt adhesive having a Brookfield viscosity in the range of 15,000 to 58,000 centipoises at said temperature and a ring and ball softening point in the range of 160–240° F. and said hot melt adhesive bearing corrugated medium is contacted with kraft paper liner to form a corrugated paperboard.

22. The process according to claim 21 wherein the temperature of operation is in the range of from about 280° F. to 310° F.

23. Process according to claim 21 wherein at least two corrugated mediums are contacted with at least three kraft paper liners.

24. Process according to claim 23 wherein the corrugated paperboard produced is double wall.

25. Process according to claim 23 wherein the corrugated paperboard produced is triple wall.

References Cited

UNITED STATES PATENTS

| | | | |
|---|---|---|---|
| 1,519,281 | 12/1924 | Wandel | 156—470 X |
| 1,770,757 | 7/1930 | Maston | 156—473 |
| 1,981,338 | 11/1934 | Swift | 156—474 |
| 3,189,502 | 6/1965 | Little | 156—210 |
| 3,308,006 | 3/1967 | Kresse et al. | 161—137 |
| 3,341,104 | 9/1967 | Loheed et al. | |
| 3,204,602 | 9/1965 | Ferara | 156—473 X |
| 3,419,641 | 12/1968 | Peterkin et al. | 260—897 |

JOHN T. GOOLKASIAN, Primary Examiner

R. A. KILLWORTH, Assistant Examiner

U.S. Cl. X.R.

156—210, 322, 327, 332; 161—133, 137, 251; 260—897